United States Patent
Kaneko et al.

(10) Patent No.: US 12,448,728 B2
(45) Date of Patent: Oct. 21, 2025

(54) TREATMENT AGENT FOR POLYESTER SYNTHETIC FIBERS, COMPOSITION CONTAINING TREATMENT AGENT FOR POLYESTER SYNTHETIC FIBERS, FIRST TREATMENT AGENT FOR POLYESTER SYNTHETIC FIBERS, SECOND TREATMENT AGENT FOR POLYESTER SYNTHETIC FIBERS, COMPOSITION CONTAINING FIRST TREATMENT AGENT FOR POLYESTER SYNTHETIC FIBERS, TREATMENT METHOD FOR POLYESTER SYNTHETIC FIBERS, AND POLYESTER SYNTHETIC FIBERS

(71) Applicant: Takemoto Oil & Fat Co., Ltd., Gamagori (JP)

(72) Inventors: Ikki Kaneko, Gamagori (JP); Takashige Ohgai, Gamagori (JP)

(73) Assignee: Takemoto Oil & Fat Co., Ltd., Gamagori (JP)

( * ) Notice: Subject to any disclaimer, the term of this patent is extended or adjusted under 35 U.S.C. 154(b) by 0 days.

(21) Appl. No.: 18/728,636

(22) PCT Filed: Jan. 13, 2023

(86) PCT No.: PCT/JP2023/000717
§ 371 (c)(1),
(2) Date: Jul. 12, 2024

(87) PCT Pub. No.: WO2023/136316
PCT Pub. Date: Jul. 20, 2023

(65) Prior Publication Data
US 2025/0003147 A1    Jan. 2, 2025

(30) Foreign Application Priority Data
Jan. 17, 2022    (JP) ................. 2022-005178

(51) Int. Cl.
| | |
|---|---|
| *D06M 15/643* | (2006.01) |
| *D06M 13/165* | (2006.01) |
| *D06M 13/203* | (2006.01) |
| *D06M 13/292* | (2006.01) |
| *D06M 15/53* | (2006.01) |
| *D06M 15/65* | (2006.01) |
| *D06M 15/653* | (2006.01) |
| *D06M 23/10* | (2006.01) |
| *D06M 101/32* | (2006.01) |

(52) U.S. Cl.
CPC ...... *D06M 15/6436* (2013.01); *D06M 13/165* (2013.01); *D06M 13/203* (2013.01); *D06M 13/292* (2013.01); *D06M 15/53* (2013.01); *D06M 15/65* (2013.01); *D06M 15/653* (2013.01); *D06M 23/10* (2013.01); *D06M 2101/32* (2013.01)

(58) Field of Classification Search
CPC .. D01F 9/04; D01F 11/02; D01D 5/02; D01D 10/06; D10B 2201/00
USPC .......................................................... 428/364
See application file for complete search history.

(56) References Cited

U.S. PATENT DOCUMENTS

| | | |
|---|---|---|
| 4,502,889 A | 3/1985 | Kurita |
| 2020/0332148 A1 | 10/2020 | Gotou et al. |
| 2022/0170202 A1 | 6/2022 | Ito et al. |

FOREIGN PATENT DOCUMENTS

| | | |
|---|---|---|
| JP | S59-122548 A | 7/1984 |
| JP | S61-186582 A | 8/1986 |
| JP | H03-249281 A | 11/1991 |
| JP | H08-120571 A | 5/1996 |
| JP | H09-279480 A | 10/1997 |
| JP | 2001-248062 A | 9/2001 |
| JP | 2005-298689 A | 10/2005 |
| JP | 4749677 B2 | 8/2011 |
| JP | 2013-177495 A | 9/2013 |
| JP | 2014111709 * | 6/2014 |
| JP | 2020-059799 A | 4/2020 |
| JP | 2021127548 * | 9/2021 |
| WO | WO 2019/131456 A1 | 7/2019 |
| WO | WO 2021/235051 A1 | 11/2021 |

OTHER PUBLICATIONS

International Search Report and Written Opinion dated Mar. 20, 2023, in connection with International Application No. PCT/JP2023/000717, with English translation thereof.
Extended European Search Report dated May 19, 2025, in connection with European Application No. 23740324.1.

* cited by examiner

*Primary Examiner* — Camie S Thompson
(74) *Attorney, Agent, or Firm* — Wolf, Greenfield & Sacks, P.C.

(57) ABSTRACT

Disclosed is a polyester synthetic fiber treatment agent that contains a silicone (A), a silicone (B), a nonionic surfactant, an anionic ingredient, and optionally a silicone (C). The amount of the silicone (C) contained in the polyester synthetic fiber treatment agent is less than 10% by mass. The silicone (A) is a silanol-modified silicone with a number average molecular weight of not less than 50,000 but less than 200,000. The silicone (B) is a silane coupling agent having at least one functional group selected from the group consisting of a methoxy group, an ethoxy group, an amino group, and an isocyanate group but not including an epoxy group in the molecule. The silicone (C) is at least one selected from the group consisting of silicone resins, dimethyl silicones, and alkyl-modified silicones but excluding those corresponding to being the silicone (A).

12 Claims, No Drawings

TREATMENT AGENT FOR POLYESTER SYNTHETIC FIBERS, COMPOSITION CONTAINING TREATMENT AGENT FOR POLYESTER SYNTHETIC FIBERS, FIRST TREATMENT AGENT FOR POLYESTER SYNTHETIC FIBERS, SECOND TREATMENT AGENT FOR POLYESTER SYNTHETIC FIBERS, COMPOSITION CONTAINING FIRST TREATMENT AGENT FOR POLYESTER SYNTHETIC FIBERS, TREATMENT METHOD FOR POLYESTER SYNTHETIC FIBERS, AND POLYESTER SYNTHETIC FIBERS

CROSS REFERENCE TO RELATED APPLICATIONS

This Application is a national stage filing under 35 U.S.C. 371 of International Patent Application Serial No. PCT/JP2023/000717, filed Jan. 13, 2023, which claims priority to Japanese application number 2022-005178, filed Jan. 17, 2022. The entire contents of these applications are incorporated herein by reference in their entirety.

TECHNICAL FIELD

The present invention relates to a polyester synthetic fiber treatment agent, a composition containing a polyester synthetic fiber treatment agent, a first agent for treating a polyester synthetic fiber, a second agent for treating a polyester synthetic fiber, a composition containing a first agent for treating a polyester synthetic fiber, a method for treating a polyester synthetic fiber, and a polyester synthetic fiber.

BACKGROUND ART

A synthetic fiber treatment agent may be adhered to the surface of synthetic fibers, for example, in a fiber spinning and drawing process and a finishing process of the fibers from standpoints of, for example, friction reduction, antistatic property, and bundling property of the synthetic fibers.

Synthetic fiber treatment agents disclosed in Patent Documents 1 to 4 are previously known. Patent Document 1 discloses a silicone emulsion composition that contains a silicone with a modified silicone having a functional group such as an amino group as an essential ingredient, a surfactant with a polyalkylene oxide adduct as an essential ingredient, and water. Patent Document 2 discloses a water-repellent composition that contains an amino-modified silicone, a silicone resin, and an alkylpolysiloxane. Patent Document 3 discloses a silicone oil composition that contains a silicone oil having a specific siloxane structure and a specific polyoxyalkylene alkyl or alkenyl ether. Patent Document 4 discloses a silicone emulsion composition that contains a dimethyl silicone and/or an amino-modified silicone, a surfactant that is a specific polyoxyalkylene alkyl ether, and water.

CITATION LIST

Patent Literature

Patent Document 1: Japanese Laid-Open Patent Publication No. 2013-177495
Patent Document 2: International Publication No. WO 2019/131456
Patent Document 3: Japanese Laid-Open Patent Publication No. 2020-59799
Patent Document 4: Japanese Patent No. 4749677

SUMMARY OF INVENTION

Technical Problem

With each of the conventional synthetic fiber treatment agents, the respective benefits of improvements of the stability and of the antistatic property and flexibility of fibers with the synthetic fiber treatment agent applied thereto cannot be realized sufficiently at the same time.

Solution to Problem

As a result of performing research toward solving the above problem, the inventors of the present application found that a polyester synthetic fiber treatment agent containing a specific silicone, a nonionic surfactant, and an anionic ingredient is suitable.

To solve the above problem and in accordance with one aspect of the present invention, a polyester synthetic fiber treatment agent is provided that contains a silicone (A) described below, a silicone (B) described below, a nonionic surfactant, an anionic ingredient, and optionally a silicone (C) described below and is characterized in that the amount of the silicone (C) contained in the polyester synthetic fiber treatment agent is less than 10% by mass.

The silicone (A) is a silanol-modified silicone with a number average molecular weight of not less than 50,000 but less than 200,000.

The silicone (B) is a silane coupling agent having at least one functional group selected from the group consisting of a methoxy group, an ethoxy group, an amino group, and an isocyanate group but not including an epoxy group in the molecule.

The silicone (C) is at least one selected from the group consisting of silicone resins, dimethyl silicones, and alkyl-modified silicones but excluding those corresponding to being the silicone (A).

In the polyester synthetic fiber treatment agent, the silicone (B) may include an amino group in the molecule.

In the polyester synthetic fiber treatment agent, the nonionic surfactant may include a compound in which not less than 3 moles and not more than 50 moles in total of an alkylene oxide with not less than 2 and not more than 3 carbon atoms are added to 1 mole of a monohydric or higher and tetrahydric or lower alcohol with not less than 2 and not more than 18 carbon atoms.

In the polyester synthetic fiber treatment agent, the anionic ingredient may include at least one selected from the group consisting of organic acids, alkyl sulfonic acids, alkyl sulfuric acids, polyoxyalkylene alkyl sulfuric acids, alkyl phosphoric acid esters, polyoxyalkylene alkyl phosphoric acid esters, and salts thereof.

In the polyester synthetic fiber treatment agent, the amount of the silicone (A) contained may be not less than 50% by mass and not more than 95% by mass, the amount of the silicone (B) contained may be not less than 1% by mass and not more than 25% by mass, the amount of the silicone (C) contained may be not less than 0% by mass but less than 10% by mass, the amount of the nonionic surfactant contained may be not less than 1% by mass and not more than 20% by mass, and the amount of the anionic ingredient contained may be not less than 0.1% by mass and not more than 20% by mass.

The polyester synthetic fiber treatment agent may be arranged as a set that includes a first agent for treating a polyester synthetic fiber containing the silicone (A), the nonionic surfactant, the anionic ingredient, and optionally the silicone (C) and a second agent for treating a polyester synthetic fiber containing the silicone (B).

To solve the above problem and in accordance with another aspect of the present invention, a composition containing a polyester synthetic fiber treatment agent is characterized by containing the polyester synthetic fiber treatment agent and a solvent.

To solve the above problem and in accordance with another aspect of the present invention, a first agent for treating a polyester synthetic fiber is provided that is combined in use with a second agent for treating a polyester synthetic fiber containing a silicone (B) described below, contains a silicone (A) described below, a nonionic surfactant, an anionic ingredient, and optionally a silicone (C) described below, and is characterized in that the amount of the silicone (C) contained in a mixture of the first agent for treating a polyester synthetic fiber and the second agent for treating a polyester synthetic fiber is less than 10% by mass.

The silicone (A) is a silanol-modified silicone with a number average molecular weight of not less than 50,000 but less than 200,000.

The silicone (B) is a silane coupling agent having at least one functional group selected from the group consisting of a methoxy group, an ethoxy group, an amino group, and an isocyanate group but not including an epoxy group in the molecule.

The silicone (C) is at least one selected from the group consisting of silicone resins, dimethyl silicones, and alkyl-modified silicones but excluding those corresponding to being the silicone (A).

To solve the above problem and in accordance with another aspect of the present invention, a composition containing a first agent for treating a polyester synthetic fiber is provided that contains the first agent for treating a polyester synthetic fiber and a solvent.

To solve the above problem and in accordance with another aspect of the present invention, a method for treating a polyester synthetic fiber is provided that includes applying to a polyester synthetic fiber a dilute liquid of a polyester synthetic fiber treatment agent that is obtained by adding to a solvent a second agent for treating a polyester synthetic fiber containing a silicone (B) described below and the composition containing a first agent for treating a polyester synthetic fiber.

The silicone (B) is a silane coupling agent having at least one functional group selected from the group consisting of a methoxy group, an ethoxy group, an amino group, and an isocyanate group but not including an epoxy group in the molecule.

In the method for treating a polyester synthetic fiber, the fiber to which the dilute liquid of a polyester synthetic fiber treatment agent has been applied may be heat treated at not less than 100° C. and not more than 200° C.

To solve the above problem and in accordance with another aspect of the present invention, a polyester synthetic fiber is provided to which the polyester synthetic fiber treatment agent is adhered.

The polyester synthetic fiber may be applied to wadding.

Advantageous Effects of Invention

The present invention succeeds in improving the stability of a synthetic fiber treatment agent as well as the antistatic property and flexibility of fibers with the synthetic fiber treatment agent applied thereto.

DESCRIPTION OF EMBODIMENTS

First Embodiment

A first embodiment that embodies a polyester synthetic fiber treatment agent of the present invention (also referred to hereinafter as treatment agent) will now be described. The treatment agent of the present embodiment contains a silicone (A) and a silicone (B) described below, a nonionic surfactant, and an anionic ingredient. The treatment agent may optionally further contain a silicone (C) described below.

(Silicone (A))

The silicone (A) used in the treatment agent of the present embodiment is a silanol-modified silicone with a number average molecular weight of not less than 50,000 but less than 200,000. As the silanol-modified silicone, a polydimethylsiloxane compound in which a hydroxy group that is also expressed as a silanol group is directly bonded to a terminal silicon atom of the main chain can be used.

The lower limit of the number average molecular weight of the silanol-modified silicone is not less than 50,000 and preferably not less than 100,000. When the number average molecular weight is not less than 50,000, the stability of the treatment agent during use, especially the emulsion stability when the treatment agent is put in an emulsion state can be improved. The upper limit of the number average molecular weight of the silanol-modified silicone is less than 200,000 and preferably not more than 150,000. When the number average molecular weight is less than 200,000, the flexibility of fibers with the treatment agent applied thereto can be improved. Any combination of the upper and lower limits may be used. The number average molecular weight of the silanol-modified silicone can be measured using gel permeation chromatography (GPC). The silicone (A) may be used either alone or in combination of two or more types as appropriate.

The lower limit of the silicone (A) content in the treatment agent is preferably not less than 35% by mass and more preferably not less than 50% by mass. When this content is not less than 35% by mass, the stability of the treatment agent during use, especially the emulsion stability when the treatment agent is put in an emulsion state can be improved. The upper limit of the silicone (A) content in the treatment agent is preferably not more than 97% by mass and more preferably not more than 95% by mass. When this content is not more than 97% by mass, the stability of the treatment agent during use, especially the emulsion stability when the treatment agent is put in an emulsion state can be improved. Any combination of the upper and lower limits may be used.

(Silicone (B))

The silicone (B) used in the treatment agent of the present embodiment is a silane coupling agent having at least one functional group selected from the group consisting of a methoxy group, an ethoxy group, an amino group, and an isocyanate group but not including an epoxy group in the molecule. The silicone (B) can improve the flexibility of fibers with the treatment agent applied thereto. Specific examples of the silicone (B) include 3-aminopropyltriethoxysilane, N-2-(aminoethyl)-3-aminopropylmethyldimethoxysilane, N-2-(aminoethyl)-3-aminopropyltrimethoxysilane, methyltrimethoxysilane, methyltriethoxysilane, and 3-isocyanatopropyltriethoxysilane. Among these, a silane coupling agent that includes an amino group in the molecule is preferable as the silicone (B). With the silane coupling agent that includes an amino group, the flexibility of fibers with the treatment agent applied thereto can be improved.

The silicone (B) may be used either alone or in combination of two or more types as appropriate.

The lower limit of the silicone (B) content in the treatment agent is preferably not less than 0.5% by mass and more preferably not less than 1% by mass. When this content is not less than 0.5% by mass, the flexibility of fibers with the treatment agent applied thereto can be improved. The upper limit of the silicone (B) content in the treatment agent is preferably not more than 30% by mass and more preferably not more than 25% by mass. When this content is not more than 30% by mass, the flexibility of fibers with the treatment agent applied thereto can be improved. Any combination of the upper and lower limits may be used.

(Silicone (C))

The silicone (C) used in the treatment agent of the present embodiment is at least one selected from the group consisting of silicone resins, dimethyl silicones, and alkyl-modified silicones but excludes those corresponding to being the silicone (A). The silicone (C) may be contained optionally in the treatment agent.

Examples of the silicone resins include MQ silicone resins, MDQ silicone resins, T silicone resins, and MTQ silicone resins.

The M, D, T, and Q that were indicated in relation to the silicone resins will now be described. Using M, D, T, and Q to describe a silicone resin is a common way of describing the components constituting the silicone resin and M is a monofunctional constituent unit $R^1R^2R^3SiO_{1/2}$, D is a difunctional constituent unit $R^4R^5SiO_{2/2}$, T is a trifunctional constituent unit $R^6SiO_{3/2}$, and Q is a tetrafunctional constituent unit $SiO_{4/2}$. $R^1$ to $R^6$ are each a hydrocarbon group with 1 to 24 carbon atoms, an organic amino group represented by, for example, $-R^aNHR^bNH_2$ (in the formula, $R^a$ and $R^b$ are each a hydrocarbon group with 2 or 3 carbon atoms) or $-R^cNH_2$ (in the formula, $R^c$ is a hydrocarbon group with 2 or 3 carbon atoms), a vinyl group, or a carbinol group.

The dimethyl silicone is not particularly limited, but preferably has a viscosity at 25° C. of not less than 5 mPa·s and not more than 5,000 mPa·s. A known dimethyl silicone specified by viscosity can be used as appropriate.

Examples of the alkyl-modified silicones include those obtained by introducing an introduced organic group constituted of $-C_aH_{2a+1}$ to the side chain of a silicone oil that is a straight-chain polymer constituted of siloxane bonds.

The alkyl-modified silicone is not particularly limited, but preferably has a viscosity at 25° C. of not less than 5 mPa·s and not more than 5,000 mPa·s. A known alkyl-modified silicone specified by viscosity can be used as appropriate.

The silicone (C) may be used either alone or in combination of two or more types as appropriate.

The silicone (C) content in the treatment agent is less than 10% by mass. When the silicone (C) content is less than 10% by mass, the stability of the treatment agent during use, especially the emulsion stability when the treatment agent is put in an emulsion state and the antistatic property of fibers with the treatment agent applied thereto are not impaired.

(Nonionic Surfactant)

Examples of the nonionic surfactant used in the treatment agent of the present embodiment include an alkylene oxide adduct of an alcohol or a carboxylic acid having a (poly) oxyalkylene structure, an alkylene oxide adduct of a polyhydric alcohol having a (poly)oxyalkylene structure, an ether ester compound having a (poly)oxyalkylene structure in which an alkylene oxide is added to an ester compound of a carboxylic acid and a polyhydric alcohol, an alkylene oxide adduct of an amine compound such as an alkylamine having a (poly)oxyalkylene structure, and a partial ester compound of, for example, a carboxylic acid and a polyhydric alcohol with not less than 3 and not more than 6 carbon atoms.

Specific examples of an alcohol used as a raw material of the nonionic surfactant include (1) straight-chain alkyl alcohols, such as methanol, ethanol, propanol, butanol, pentanol, hexanol, octanol, nonanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, pentacosanol, hexacosanol, heptacosanol, octacosanol, nonacosanol, and triacontanol, (2) branched alkyl alcohols, such as isopropanol, isobutanol, isohexanol, 2-ethylhexanol, isononanol, isodecanol, isododecanol, isotridecanol, isotetradecanol, isotriacontanol, isohexadecanol, isoheptadecanol, isooctadecanol, isononadecanol, isoeicosanol, isoheneicosanol, isodocosanol, isotricosanol, isotetracosanol, isopentacosanol, isohexacosanol, isoheptacosanol, isooctacosanol, isononacosanol, and isopentadecanol, (3) straight-chain alkenyl alcohols, such as tetradecenol, hexadecenol, heptadecenol, octadecenol, and nonadecenol, (4) branched alkenyl alcohols, such as isohexadecenol and isooctadecenol, (5) cyclic alkyl alcohols, such as cyclopentanol and cyclohexanol, and (6) aromatic alcohols, such as phenol, nonylphenol, benzyl alcohol, monostyrenated phenol, distyrenated phenol, and tristyrenated phenol.

Specific examples of a carboxylic acid used as a raw material of the nonionic surfactant include (1) straight-chain alkyl carboxylic acids, such as octylic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, and docosanoic acid, (2) branched alkyl carboxylic acids, such as 2-ethylhexanoic acid, isododecanoic acid, isotridecanoic acid, isotetradecanoic acid, isohexadecanoic acid, and isooctadecanoic acid, (3) straight-chain alkenyl carboxylic acids such as octadecenoic acid, octadecadienoic acid, and octadecatrienoic acid, (4) aromatic carboxylic acid, such as benzoic acid, and (5) hydroxycarboxylic acids, such as ricinoleic acid.

Preferable examples of an alkylene oxide used as a raw material for forming the (poly)oxyalkylene structure of the nonionic surfactant include an alkylene oxide with not less than 2 and not more than 4 carbon atoms. Specific examples of the alkylene oxide include ethylene oxide, propylene oxide, and butylene oxide. The number of moles of alkylene oxide added is set as appropriate and is preferably not less than 0.1 moles and not more than 60 moles, more preferably not less than 3 moles and not more than 50 moles, and even more preferably not less than 5 moles and not more than 20 moles. Any combination of the upper and lower limits may be used. The number of moles of alkylene oxide added represents the number of moles of the alkylene oxide with respect to 1 mole of the alcohol or the carboxylic acid in the charged raw materials. The alkylene oxide may be used either alone or in combination of two or more types as appropriate. If two or more types of alkylene oxides are used in combination, the form of addition thereof may be any of block addition, random addition, and combination of block addition and random addition and is not particularly limited.

Specific examples of a polyhydric alcohol used as a raw material of the nonionic surfactant include ethylene glycol, propylene glycol, 1,3-propanediol, 1,2-butanediol, 1,3-butanediol, 1,4-butanediol, 2-methyl-1,2-propanediol, 1,5-pentanediol, 1,6-hexanediol, 2,5-hexanediol, 2-methyl-2,4-pentanediol, 2,3-dimethyl-2,3-butanediol, glycerin, 2-methyl-2-hydroxymethyl-1,3-propanediol, trimethylolpropane, sorbitan, pentaerythritol, and sorbitol.

Specific examples of an alkylamine used as a raw material of the nonionic surfactant include methylamine, ethylamine, butylamine, octylamine, laurylamine, octadecylamine, octadecenylamine, and coconut amine.

The nonionic surfactant may be used either alone or in combination of two or more types as appropriate.

Among these, a compound is preferable in which not less than 3 moles and not more than 50 moles in total of an alkylene oxide with not less than 2 and not more than 3 carbon atoms are added to 1 mole of a monohydric or higher and tetrahydric or lower alcohol with not less than 2 and not more than 18 carbon atoms. Also, a compound is more preferable in which not less than 5 moles and not more than 20 moles in total of ethylene oxide and propylene oxide are added to 1 mole of a monohydric or higher and tetrahydric or lower alcohol with not less than 2 and not more than 18 carbon atoms. These compounds can improve the antistatic property of fibers with the treatment agent applied thereto.

Specific examples of the nonionic surfactant include polyoxyethylene (6 moles: represents the number of moles of alkylene oxide added (the same applies hereinafter)) polyoxypropylene (2) dodecyl ether, polyoxyethylene (10) C12-13 branched alkyl ethers, polyoxyethylene (20) sorbitan monostearate, and polyoxyethylene (40) hydrogenated castor oil.

The lower limit of the nonionic surfactant content in the treatment agent is preferably not less than 0.5% by mass and more preferably not less than 1% by mass. When this content is not less than 0.5% by mass, the stability of the treatment agent during use, especially the emulsion stability when the treatment agent is put in an emulsion state can be improved. The upper limit of the nonionic surfactant content in the treatment agent is preferably not more than 30% by mass and more preferably not more than 20% by mass. When this content is not more than 30% by mass, the flexibility of fibers with the treatment agent applied thereto can be improved. Any combination of the upper and lower limits may be used.

(Anionic Ingredient)

Examples of the anionic ingredient used in the treatment agent of the present embodiment include an anionic compound, such as an acid and a salt thereof. The anionic ingredient can improve the antistatic property of fibers with the treatment agent applied thereto.

Examples of the acid include an inorganic acid, organic acid, fatty acid, alkyl sulfonic acid, alkyl sulfuric acid, polyoxyalkylene alkyl sulfuric acid, alkyl phosphoric acid ester, polyoxyalkylene alkyl phosphoric acid ester, sulfuric acid ester of fatty acid, sulfuric acid ester of oil or fat, and a salt of any of the above.

Specific examples of the inorganic acid or salt thereof include hydrochloric acid, sulfuric acid, phosphoric acid, nitric acid, carbonic acid, sodium hydrogen sulfate, sodium dihydrogen phosphate, disodium hydrogen phosphate, and sodium hydrogen carbonate.

Specific examples of the organic acid include citric acid, tartaric acid, lactic acid, malic acid, succinic acid, fumaric acid, maleic acid, gluconic acid, glucuronic acid, and benzoic acid.

As the fatty acid, a known fatty acid can be used as appropriate and it may be a saturated fatty acid or an unsaturated fatty acid. It also may be in a straight chain form or have a branched chain structure. It also may be a monovalent fatty acid or a polyvalent carboxylic acid (polybasic acid).

Specific examples of the saturated fatty acid include formic acid, acetic acid, propionic acid, butyric acid, valeric acid, hexanoic acid (caproic acid), octylic acid (2-ethylhexanoic acid), octanoic acid (caprylic acid), nonanoic acid, decanoic acid (capric acid), dodecanoic acid (lauric acid), tetradecanoic acid (myristic acid), hexadecanoic acid (palmitic acid), octadecanoic acid (stearic acid), eicosanoic acid (arachidic acid), docosanoic acid (behenic acid), and tetracosanoic acid.

Specific examples of the unsaturated fatty acid include crotonic acid, myristoleic acid, palmitoleic acid, oleic acid, vaccenic acid, eicosenoic acid, linoleic acid, α-linolenic acid, γ-linolenic acid, and arachidonic acid.

Specific examples of the polyvalent carboxylic acid (polybasic acid) include (1) dibasic acids, such as succinic acid, fumaric acid, maleic acid, adipic acid, and sebacic acid, (2) tribasic acids, such as aconitic acid, (3) aromatic dicarboxylic acids, such as benzoic acid, terephthalic acid, isophthalic acid, and 2,6-naphthalenedicarboxylic acid, (4) aromatic tricarboxylic acids, such as trimellitic acid, (5) aromatic tetracarboxylic acids, such as pyromellitic acid.

Among these fatty acids, a fatty acid with not less than 8 and not more than 18 carbon atoms are preferable from a standpoint that fibers with the treatment agent applied thereto are excellent in antistatic property.

Specific examples of the alkyl sulfonic acid include lauryl sulfonic acid (dodecyl sulfonic acid), myristyl sulfonic acid, cetyl sulfonic acid, oleyl sulfonic acid, stearyl sulfonic acid, tetradecane sulfonic acid, dodecyl benzene sulfonic acid, and secondary alkyl sulfonic acids (C13 to C15).

Specific examples of the alkyl sulfuric acid include lauryl sulfuric acid ester, oleyl sulfuric acid ester, and stearyl sulfuric acid ester.

Specific examples of the polyoxyalkylene alkyl sulfuric acid include polyoxyethylene lauryl ether sulfuric acid ester, polyoxyalkylene (polyoxyethylene, polyoxypropylene) lauryl ether sulfuric acid esters, polyoxyethylene dodecyl ether sulfuric acid ester, and polyoxyethylene oleyl ether sulfuric acid ester.

Specific examples of the alkyl phosphoric acid ester include lauryl phosphoric acid ester, cetyl phosphoric acid ester, octyl phosphoric acid ester, oleyl phosphoric acid ester, and stearyl phosphoric acid ester.

Specific examples of the polyoxyalkylene alkyl phosphoric acid ester include polyoxyethylene lauryl ether phosphoric acid ester, polyoxyethylene oleyl ether phosphoric acid ester, and polyoxyethylene stearyl ether phosphoric acid ester.

Specific examples of the sulfuric acid ester of fatty acid include castor oil fatty acid sulfuric acid ester, sesame oil fatty acid sulfuric acid ester, tall oil fatty acid sulfuric acid ester, soybean oil fatty acid sulfuric acid ester, rapeseed oil fatty acid sulfuric acid ester, palm oil fatty acid sulfuric acid ester, lard fatty acid sulfuric acid ester, beef tallow fatty acid sulfuric acid ester, and whale oil fatty acid sulfuric acid ester.

Specific examples of the sulfuric acid ester of oil or fat include sulfuric acid ester of castor oil, sulfuric acid ester of sesame oil, sulfuric acid ester of tall oil, sulfuric acid ester of soybean oil, sulfuric acid ester of rapeseed oil, sulfuric acid ester of palm oil, sulfuric acid ester of lard, sulfuric acid ester of beef tallow, and sulfuric acid ester of whale oil.

Examples of the salt include an ammonium salt, an amine salt, and a metal salt. Examples of the metal salt include an alkali metal salt and an alkaline earth metal salt. Examples of an alkali metal that constitutes the alkali metal salt include sodium, potassium, and lithium. Examples of an alkaline earth metal that constitutes the alkaline earth metal salt include a metal corresponding to being a group 2 element, such as calcium, magnesium, beryllium, strontium, and barium.

An amine that constitutes the amine salt may be any of primary amines, secondary amines, and tertiary amines. Specific examples of an amine that constitutes the amine salt include (1) aliphatic amines, such as methylamine, dimethylamine, trimethylamine, ethylamine, diethylamine, triethylamine, N—N-diisopropylethylamine, butylamine, dibutylamine, 2-methylbutylamine, tributylamine, octylamine, and dimethyllaurylamine, (2) aromatic amines or heterocyclic amines, such as aniline, N-methylbenzylamine, pyridine, morpholine, piperazine, and derivatives of the above, (3) alkanolamines, such as monoethanolamine, N-methylethanolamine, diethanolamine, triethanolamine, isopropanolamine, diisopropanolamine, triisopropanolamine, dibutylethanolamine, butyldiethanolamine, octyldiethanolamine, and lauryldiethanolamine, (4) aryl amines, such as N-methylbenzylamine, (5) polyoxyalkylene alkyl aminoethers, such as polyoxyethylene lauryl aminoethers and polyoxyethylene stearyl aminoethers, and (6) ammonia.

Among the anionic ingredients described above, for example, a metal salt of a fatty acid constitutes an anionic surfactant. Therefore, an anionic surfactant may be used as the anionic ingredient.

The anionic ingredient may be used either alone or in combination of two or more types as appropriate.

Among the above, organic acids, alkyl sulfonic acids, alkyl sulfuric acids, polyoxyalkylene alkyl sulfuric acids, alkyl phosphoric acid esters, polyoxyalkylene alkyl phosphoric acid esters, and metal salts thereof are preferable. By using such a compound, the antistatic property of fibers with the treatment agent applied thereto can be improved. Also, alkyl sulfonic acid metal salts and alkyl phosphoric acid ester metal salts are preferable from a standpoint of being excellent in terms of emulsification characteristics of the treatment agent.

The lower limit of the anionic ingredient content in the treatment agent is preferably not less than 0.05% by mass and more preferably not less than 1% by mass. When this content is not less than 0.05% by mass, the stability of the treatment agent during use, especially the emulsion stability when the treatment agent is put in an emulsion state can be improved. The upper limit of the anionic ingredient content in the treatment agent is preferably not more than 35% by mass and more preferably not more than 20% by mass. When this content is not more than 35% by mass, the flexibility of fibers with the treatment agent applied thereto can be improved. Any combination of the upper and lower limits may be used.

In the treatment agent, the amount of the silicone (A) contained is preferably not less than 50% by mass and not more than 95% by mass, the amount of the silicone (B) contained is preferably not less than 1% by mass and not more than 25% by mass, the amount of the silicone (C) contained is preferably not less than 0% by mass but less than 10% by mass, the amount of the nonionic surfactant contained is preferably not less than 1% by mass and not more than 20% by mass, and the amount of the anionic ingredient contained is preferably not less than 0.1% by mass and not more than 20% by mass. Any combination of the upper and lower limits may be used. By specifying to be in such range, the effects of the present invention can be improved.

(Form of Preservation)

The treatment agent may be arranged as a set that includes a first agent for treating a polyester synthetic fiber (hereinafter referred to as "first treatment agent") containing the silicone (A), the nonionic surfactant, the anionic ingredient, and optionally the silicone (C) and a second agent for treating a polyester synthetic fiber (hereinafter referred to as "second treatment agent") containing the silicone (B). The first treatment agent contains the silicone (C) such that its content in a mixture of the first treatment agent and the second treatment agent is less than 10% by mass. The treatment agent is constituted of the first treatment agent and the second treatment agent that are separate from each other before use, for example, during preservation or during distribution. In use, the first treatment agent and the second treatment agent are mixed with each other to prepare the treatment agent.

(Solvent)

The treatment agent of the present embodiment may be mixed as necessary with a solvent to prepare a composition containing a polyester synthetic fiber treatment agent (hereinafter referred to as "treatment agent-containing composition") and be preserved or distributed in the form of the treatment agent-containing composition.

The solvent is a solvent having a boiling point at atmospheric pressure of not more than 105° C. Examples of the solvent include water and an organic solvent. Specific examples of the organic solvent include lower alcohols, such as ethanol and propanol, and low polarity solvents, such as hexane. The solvent may be used either alone or in combination of two or more types as appropriate. Among these, a polar solvent, such as water or a lower alcohol is preferable from a standpoint of being excellent in terms of the dispersibility and solubility of the respective ingredients and water is more preferable from a standpoint of being excellent in handleability.

Assuming that the sum of the amounts of the treatment agent and the solvent contained in the treatment agent-containing composition is 100 parts by mass, the amount of the treatment agent contained in the treatment agent-containing composition is not less than 10 parts by mass and not more than 80 parts by mass.

Effects of the treatment agent of the first embodiment will now be described.

(1-1) The treatment agent of the first embodiment contains the specific silicones, the nonionic surfactant, and the anionic ingredient. Therefore, the stability of the treatment agent during use, especially the emulsion stability when the treatment agent is put in an emulsion state can be improved. Also, the antistatic property, the flexibility, and the bulkiness of fibers with the treatment agent applied thereto can be improved.

(1-2) The treatment agent of the first embodiment may be arranged as a set that includes the first fiber treatment agent containing the silicone (A), the nonionic surfactant, the anionic ingredient, and optionally the silicone (C) and the second treatment agent containing the silicone (B). By such a set, the formulation stability and especially the preservation stability of the treatment agent can be improved.

Second Embodiment

Next, a second embodiment that embodies a first treatment agent of the present invention will be described, focusing on the differences from the first embodiment.

The first treatment agent of the present embodiment contains a silicone (A), a nonionic surfactant, an anionic ingredient, and optionally a silicone (C). The first treatment agent is combined in use with a second treatment agent containing a silicone (B). The silicone (A), the silicone (B), the nonionic surfactant, the anionic ingredient, and the silicone (C) are the same as those described respectively in the first embodiment. The first treatment agent contains the silicone (C) such that its content in a mixture in use, that is, in a mixture of the first treatment agent and the second treatment agent is less than 10% by mass.

(Solvent)

The first treatment agent of the present embodiment may be mixed as necessary with a solvent to prepare a composition containing a first agent for treating a polyester synthetic fiber (hereinafter referred to as "first treatment agent-containing composition") and be preserved or distributed in the form of the first treatment agent-containing composition.

The solvent can be the same as exemplified in the first embodiment. Assuming that the sum of the amounts of the first treatment agent and the solvent contained in the first treatment agent-containing composition is 100 parts by mass, the amount of the first treatment agent contained in the first treatment agent-containing composition is not less than 10 parts by mass and not more than 80 parts by mass.

Effects of the first treatment agent of the second embodiment will now be described. With the second embodiment, the effects described below are provided in addition to the effects of the first embodiment.

(2-1) The first treatment agent of the second embodiment contains the silicone (A), the nonionic surfactant, the anionic ingredient, and optionally the silicone (C) and is combined in use with the second treatment agent containing the silicone (B). The formulation stability and especially the preservation stability of the first treatment agent can thus be improved. Also, by adjusting the mixing ratio with respect to the second treatment agent, the ingredients in the treatment agent obtained can be adjusted. Also, just the first treatment agent can be distributed as a separate agent from the second treatment agent.

Third Embodiment

Next, a third embodiment that embodies a second treatment agent of the present invention will be described, focusing on the differences with respect to the first and second embodiments.

The second treatment agent of the present embodiment contains a silicone (B). The second treatment agent is combined in use with a first treatment agent containing silicone (A), a nonionic surfactant, an anionic ingredient, and optionally a silicone (C). The silicone (A), the silicone (B), the nonionic surfactant, the anionic ingredient, and the silicone (C) are the same as those described respectively in the first embodiment. The first treatment agent contains the silicone (C) such that its content in a mixture in use, that is, in a mixture of the first treatment agent and the second treatment agent is less than 10% by mass.

Effects of the second treatment agent of the third embodiment will now be described. With the third embodiment, the effects described below are provided in addition to the effects of the first and second embodiments.

(3-1) The second treatment agent of the third embodiment contains the silicone (B) and it is combined in use with the first treatment agent containing the silicone (A), the nonionic surfactant, the anionic ingredient, and optionally the silicone (C). The formulation stability and especially the preservation stability of the second treatment agent can thus be improved. Also, by adjusting the mixing ratio with respect to the first treatment agent, the ingredients in the treatment agent obtained can be adjusted. Also, just the second treatment agent can be distributed as a separate agent from the first treatment agent.

Fourth Embodiment

Next, a fourth embodiment that embodies a method for treating a polyester synthetic fiber of the present invention (hereinafter referred to as "fiber treatment method") will be described.

The fiber treatment method of the present embodiment is characterized in that a treatment agent dilute liquid containing a solvent, the first treatment agent of the second embodiment, and the second treatment agent of the third embodiment is applied to a polyester synthetic fiber. The solvent can be the same as exemplified in the first embodiment. The dilute liquid preferably has a nonvolatile content of not less than 0.01% by mass and not more than 10% by mass from a standpoint of, for example, the handleability. The term nonvolatile content as used herein refers to residue after sufficient removal of volatile matter by heat treating an object at 105° C. for 2 hours, that is, to absolutely dry matter.

The dilute liquid is prepared by, for example, adding the first treatment agent or the first treatment agent-containing composition and the second treatment agent to the solvent. The dilute liquid is preferably prepared by adding the first treatment agent-containing composition of the second embodiment and the second treatment agent of the third embodiment to the solvent. By using the first treatment agent and the second treatment agent in combination, the mixing ratio of the first treatment agent and the second treatment agent can be changed as desired. Therefore, even if production conditions differ due to differences in production equipment or differences in climate such as temperature and humidity, the mixing ratio can be adjusted finely such that it is easy to prepare the treatment agent or the dilute liquid for always imparting optimal fiber characteristics or fiber production characteristics. The ratio of the first treatment agent content and the second treatment agent content is preferably such that as a mass ratio of nonvolatile contents, first treatment agent/second treatment agent is 99.5/0.5 to 70/30. By specifying to be in such range, the handleability can be improved.

To emulsify the treatment agent, the respective treatment agents or compositions may be mixed with the solvent and stirred using a known stirrer such as a homomixer, a homogenizer, a colloidal mill, or a line mixer.

The fiber treatment method includes applying to a fiber the dilute liquid obtained as described above, for example, in a spun yarn production step constituted of a fiber spinning or drawing step or a finishing step.

Examples of the fiber to which the dilute liquid is applied include a polyester synthetic fiber. Specific examples of the polyester synthetic fiber include polyethylene terephthalate (PET), polytrimethylene terephthalate, polybutylene terephthalate, polyethylene naphthalate, polylactic acid, and a composite fiber containing these polyester resins.

Use of the fiber is not restricted in particular, and example thereof include wadding, a short fiber, a long fiber, a spun yarn, and a nonwoven fabric. Short fibers correspond to those that are generally called staples and do not include long fibers that are generally called filaments. The length of the short fiber is not restricted in particular as long as it corresponds to that of short fiber in the art and is, for example, not more than 100 mm. Among these, the dilute liquid of the present invention is preferably applied to a polyester synthetic fiber for wadding. By being applied to a polyester synthetic fiber for wadding, texture such as smoothness can be imparted to wadding, for example, for stuffed toys, futons, and clothing.

The proportion of adhering the dilute liquid to the fiber is not limited in particular, and the dilute liquid is adhered such that a final solids content is preferably not less than 0.01% by mass and not more than 10% by mass and more preferably not less than 0.1% by mass and not more than 3% by mass with respect to the fiber. By such arrangement, the benefits due to the respective ingredients can be exhibited effectively. The method for adhering the dilute liquid is not limited in particular, and a known method such as a roller lubricating method, a guide lubricating method using a metering pump, an immersion lubricating method, or a spray lubricating method can be used in accordance with, for example, type, form, and use of the fiber. When an immersion lubricating method is used, the immersion time is preferably not less than 1 minute and not more than 5 minutes.

The fiber to which the dilute liquid has been adhered may be dried or heat-treated using a known method. Water and other solvents are volatilized by the drying or heat treatment, and the fiber to which the ingredients contained in the first treatment agent and the second treatment agent are adhered is thereby obtained.

The heat treatment is performed to form a silicone coating on the fiber surface. The heat treatment is preferably performed under a condition of not less than 100° C. and not more than 200° C. The heating time is set as appropriate in accordance with, for example, treatment temperature and is preferably not less than 1 minute and not more than 20 minutes and more preferably not less than 1 minute and not more than 15 minutes. By such heat treatment, the reaction between the silicone (A) and the silicone (B) is promoted, and the silicone coating that is constituted of a crosslinked polymer compound is formed on the fiber.

Effects of the fiber treatment method of the fourth embodiment will now be described. With the fourth embodiment, the effects described below are provided in addition to the effects of the first to third embodiments.

(4-1) The fiber treatment method of the fourth embodiment includes applying the dilute liquid to a fiber, for example, in a spun yarn production step constituted of a fiber spinning or drawing step or a finishing step. In particular, the dilute liquid prepared by adding the first treatment agent or the first treatment agent-containing composition of the second embodiment and the second treatment agent of the third embodiment to the solvent is excellent in emulsion stability. Benefits due to the respective ingredients on wadding, a short fiber, a long fiber, a spun yarn, and a nonwoven fabric can thus be exhibited effectively.

(4-2) With the fiber treatment method of the fourth embodiment, the fiber to which the treatment agent dilute liquid has been adhered may be heat-treated at not less than 100° C. and not more than 200° C. By such heat treatment, the reaction between the silicone (A) and the silicone (B) is promoted, and the silicone coating that is constituted of a crosslinked polymer compound is formed on the fiber. The more durable coating thus formed can improve the flexibility of the fiber.

The above-described embodiments may be modified as follows. The embodiments can be implemented in combination with the modifications described below within a range that is not technically inconsistent.

The method for preparing the treatment agent dilute liquid of the embodiments is not limited in particular, and a method for preparation other than that described in the section on the fiber treatment method of the fourth embodiment may be used. For example, the respective silicones, the nonionic surfactant, and the anionic ingredient described above may be mixed with one another and thereafter mixed with the solvent.

The respective treatment agents, respective compositions, or dilute liquid of the embodiments may further include another solvent, a stabilizer, an antistatic agent, a binder, an antioxidant, an ultraviolet absorber, an organic acid, a surfactant other than those mentioned above, and other ingredients that are ordinarily used in treatment agents or the like as other ingredients for quality maintenance of the respective treatment agents, respective compositions, or dilute liquid within a range that does not impair the effects of the present invention. The other ingredients that are ordinarily used in treatment agents other than the solvent are preferably of not more than 10% by mass in each treatment agent from a standpoint of efficiently exhibiting the benefits of the present invention.

EXAMPLES

Examples will now be given below to describe the features and effects of the present invention more specifically, but the present invention is not restricted to these examples. In the following description of working examples and comparative examples, parts means parts by mass and % means % by mass unless otherwise noted.

Experimental Part 1 (Preparation of Treatment Agents)

Example 1

As shown in Table 1, a treatment agent of Example 1 containing 75 parts (%) of silanol-modified silicone (number average molecular weight: 100,000) (A-1) as the silicone (A), 5 parts (%) of 3-aminopropyltriethoxysilane (functional groups: amino group and methoxy group) (B-1) as the silicone (B), 10 parts (%) of polyoxyethylene (6) polyoxypropylene (2) dodecyl ether (D-1) as the nonionic surfactant, and 9 parts (%) of octyl phosphoric acid ester potassium salt (E-2) and 1 part (%) of oleic acid (E-4) as the anionic ingredients was prepared.

Examples 2 to 35 and Comparative Examples 1 to 12

Treatment agents of Examples 2 to 35 and Comparative Examples 1 to 12 were prepared in the same manner as the treatment agent of Example 1 such as to contain the silicones (A), the silicones (B), the silicones (C), the nonionic surfactants, and the anionic ingredients at the amounts indicated in Table 1.

The types and contents of the silicones (A), the types and contents of the silicones (B), the types and contents of the silicones (C), the types and contents of the nonionic surfactants, and the types and contents of the anionic ingredients are respectively indicated in the "Silicone (A)" column, the "Silicone (B)" column, the "Silicone (C)" column, the "Nonionic surfactant" column, and the "Anionic ingredient" column of Table 1.

TABLE 1

| Category | Silicone (A) Type | Content (%) | Silicone (B) Type | Content (%) | Silicone (C) Type | Content (%) | Nonionic surfactant Type | Content (%) | Anionic ingredient Type | Content (%) | Type | Content (%) | Emulsifiability | Antistatic property | Flexibility | Bulkiness |
|---|---|---|---|---|---|---|---|---|---|---|---|---|---|---|---|---|
| Example 1 | A-1 | 75 | B-1 | 5 | | | D-1 | 10 | E-2 | 9 | E-4 | 1 | ⊚ | ⊚ | ⊚ | ⊚ |
| Example 2 | A-1 | 80 | B-2 | 5 | | | D-1 | 10 | E-1 | 5 | | | ⊚ | ⊚ | ⊚ | ⊚ |
| Example 3 | A-2 | 80 | B-3 | 5 | | | D-2 | 5 | E-1 | 9.5 | E-5 | 0.5 | ⊚ | ⊚ | ⊚ | ⊚ |
| Example 4 | A-2 | 55 | B-3 | 20 | | | D-1 | 15 | E-3 | 10 | | | ⊚ | ⊚ | ⊚ | ⊚ |
| Example 5 | A-3 | 93 | B-1 | 2 | | | D-2 | 3 | E-1 | 2 | | | ⊚ | ⊚ | ⊚ | ⊚ |
| Example 6 | A-1 | 60 | B-3 | 15 | | | D-1 | 5 | E-4 | 20 | | | ⊚ | ⊚ | ⊚ | ⊚ |
| Example 7 | A-2 | 80 | B-1 | 5 | C-1 | 5 | D-2 | 5 | E-1 | 5 | | | ⊚ | ⊚ | ⊚ | ⊚ |
| Example 8 | A-3 | 75 | B-2 | 5 | C-2 | 7 | D-1 | 10 | E-5 | 3 | | | ⊚ | ⊚ | ⊚ | ⊚ |
| Example 9 | A-1 | 75 | B-3 | 5 | C-3 | 5 | D-2 | 5 | E-1 | 9.5 | E-3 | 0.5 | ⊚ | ⊚ | ⊚ | ⊚ |
| Example 10 | A-4 | 80 | B-1 | 10 | | | D-2 | 5 | E-3 | 5 | | | ⊚ | ⊚ | ⊚ | ⊚ |
| Example 11 | A-5 | 60 | B-3 | 5 | | | D-1 | 20 | E-2 | 15 | | | ⊚ | ⊚ | ⊚ | ⊚ |
| Example 12 | A-3 | 65 | B-2 | 5 | | | D-1 | 10 | E-1 | 20 | | | ⊚ | ⊚ | ⊚ | ⊚ |
| Example 13 | A-2 | 80 | B-2 | 5 | | | D-2 | 5 | E-2 | 10 | | | ⊚ | ⊚ | ⊚ | ⊚ |
| Example 14 | A-3 | 75 | B-1 | 10 | | | D-1 | 10 | E-4 | 5 | | | ⊚ | ⊚ | ⊚ | ⊚ |
| Example 15 | A-3 | 75 | B-1 | 5 | | | D-2 | 5 | E-3 | 15 | | | ⊚ | ⊚ | ⊚ | ⊚ |
| Example 16 | A-1 | 50 | B-2 | 20 | | | D-1 | 10 | E-1 | 20 | | | ⊚ | ⊚ | ⊚ | ⊚ |
| Example 17 | A-2 | 80 | B-2 | 10 | | | D-1 | 4 | E-1 | 4.7 | E-5 | 1.3 | ⊚ | ⊚ | ⊚ | ⊚ |
| Example 18 | A-1 | 97 | B-1 | 1 | | | D-1 | 1 | E-2 | 1 | | | ○ | ⊚ | ⊚ | ⊚ |
| Example 19 | A-3 | 40 | B-1 | 25 | | | D-2 | 15 | E-2 | 20 | | | ⊚ | ⊚ | ⊚ | ⊚ |
| Example 20 | A-3 | 85 | B-1 | 0.5 | | | D-1 | 14 | E-5 | 0.5 | | | ⊚ | ⊚ | ○ | ⊚ |
| Example 21 | A-2 | 60 | B-3 | 30 | | | D-1 | 8 | E-4 | 2 | | | ⊚ | ⊚ | ○ | ⊚ |
| Example 22 | A-1 | 55 | B-1 | 10 | | | D-2 | 30 | E-1 | 5 | | | ⊚ | ⊚ | ○ | ⊚ |
| Example 23 | A-1 | 85 | B-2 | 10 | | | D-2 | 0.5 | E-3 | 4.5 | | | ○ | ⊚ | ○ | ⊚ |
| Example 24 | A-4 | 40 | B-1 | 10 | | | D-1 | 15 | E-2 | 35 | | | ⊚ | ⊚ | ○ | ⊚ |
| Example 25 | A-3 | 75 | B-2 | 15 | | | D-2 | 9.95 | E-1 | 0.05 | | | ○ | ⊚ | ⊚ | ⊚ |
| Example 26 | A-2 | 75 | B-1 | 10 | | | D-3 | 10 | E-2 | 5 | | | ○ | ○ | ⊚ | ⊚ |
| Example 27 | A-1 | 70 | B-3 | 10 | | | D-4 | 10 | E-1 | 10 | | | ○ | ○ | ○ | ⊚ |
| Example 28 | A-4 | 80 | B-4 | 10 | | | D-3 | 5 | E-2 | 5 | | | ○ | ○ | ○ | ⊚ |
| Example 29 | A-5 | 75 | B-5 | 15 | | | D-4 | 5 | E-1 | 5 | | | ○ | ○ | ○ | ⊚ |
| Example 30 | A-4 | 55 | B-6 | 15 | | | D-3 | 20 | E-1 | 9 | E-5 | 1 | ○ | ○ | ○ | ⊚ |
| Example 31 | A-2 | 96 | B-1 | 2 | | | D-4 | 1 | E-4 | 1 | | | ○ | ○ | ⊚ | ○ |
| Example 32 | A-3 | 40 | B-2 | 30 | | | D-4 | 15 | E-4 | 15 | | | ○ | ○ | ⊚ | ○ |
| Example 33 | A-2 | 35 | B-4 | 20 | | | D-3 | 10 | E-3 | 35 | | | ○ | ○ | ○ | ○ |
| Example 34 | A-5 | 35 | B-6 | 20 | | | D-3 | 25 | E-4 | 19 | E-2 | 1 | ○ | ○ | ○ | ○ |
| Example 35 | A-4 | 40 | B-5 | 20 | C-1 | 5 | D-3 | 20 | E-3 | 15 | | | ○ | ○ | ○ | ○ |
| Comparative example 1 | A-5 | 85 | | | | | D-2 | 15 | | | | | ○ | X | X | ○ |
| Comparative example 2 | A-2 | 80 | | | C-1 | 20 | | | | | | | X | X | X | ○ |
| Comparative example 3 | | | B-1 | 5 | C-2 | 50 | D-1 | 25 | E-2 | 20 | | | ○ | ○ | X | X |
| Comparative example 4 | A-1 | 90 | B-1 | 10 | | | | | | | | | X | X | ○ | ○ |
| Comparative example 5 | A-2 | 85 | B-1 | 10 | | | D-2 | 5 | | | | | ○ | X | ○ | ○ |
| Comparative example 6 | A-1 | 85 | B-1 | 5 | | | | | E-2 | 10 | | | X | ○ | ○ | ○ |
| Comparative example 7 | a-1 | 80 | B-2 | 5 | | | D-1 | 10 | E-1 | 5 | | | ○ | ○ | X | X |
| Comparative example 8 | a-2 | 85 | B-3 | 5 | | | D-2 | 5 | E-2 | 5 | | | X | ○ | X | X |
| Comparative example 9 | A-1 | 70 | b-1 | 15 | | | D-1 | 3 | E-1 | 10 | E-5 | 2 | ○ | ○ | X | ○ |
| Comparative example 10 | A-2 | 60 | B-2 | 5 | C-1 | 20 | D-2 | 5 | E-2 | 10 | | | X | X | ○ | ○ |
| Comparative example 11 | A-2 | 60 | B-2 | 5 | C-2 | 25 | D-1 | 5 | E-1 | 5 | | | X | X | ○ | ○ |
| Comparative example 12 | A-2 | 60 | B-2 | 5 | C-3 | 20 | D-2 | 10 | E-2 | 5 | | | X | X | ○ | ○ |

Details of the silicones (A), the silicones (B), the silicones (C), the nonionic surfactants, and the anionic ingredients indicated in Table 1 are as follows.

(Silicone (A))
  A-1: silanol-modified silicone (number average molecular weight: 100,000)
  A-2: silanol-modified silicone (number average molecular weight: 120,000)
  A-3: silanol-modified silicone (number average molecular weight: 150,000)
  A-4: silanol-modified silicone (number average molecular weight: 60,000)
  A-5: silanol-modified silicone (number average molecular weight: 180,000)
  a-1: silanol-modified silicone (number average molecular weight: 250,000)
  a-2: silanol-modified silicone (number average molecular weight: 20,000)

(Silicone (B))
  B-1: 3-aminopropyltriethoxysilane (functional groups: amino group and methoxy group)
  B-2: N-2-(aminoethyl)-3-aminopropylmethyldimethoxysilane (functional groups: amino group and methoxy group)
  B-3: N-2-(aminoethyl)-3-aminopropyltrimethoxysilane (functional groups: amino group and methoxy group)
  B-4: methyltrimethoxysilane (functional group: methoxy group)
  B-5: methyltriethoxysilane (functional group: ethoxy group)
  B-6: 3-isocyanatopropyltriethoxysilane (functional group: isocyanate group, ethoxy group)
  b-1: 3-glycidoxypropylmethyldimethoxysilane (functional groups: epoxy group and methoxy group)

(Silicone (C))
  C-1: polydimethylsiloxane (viscosity: 1,000 mPa·s)
  C-2: alkyl-modified silicone (viscosity: 500 mPa·s)

C-3: silicone resin (MQ type) (solid at ordinary temperature)

(Nonionic Surfactant)

D-1: polyoxyethylene (6) polyoxypropylene (2) dodecyl ether
D-2: polyoxyethylene (10) C12-13 branched alkyl ether
D-3: polyoxyethylene (20) sorbitan monostearate
D-4: polyoxyethylene (40) hydrogenated castor oil (Anionic Ingredient)

E-1: sodium dodecyl sulfonate
E-2: octyl phosphoric acid ester potassium salt
E-3: sodium polyoxyethylene (3) dodecyl sulfate
E-4: oleic acid
E-5: acetic acid Experimental Part 2 (Emulsifiability)

Each treatment agent prepared in Experimental Part 1 was diluted using ion exchanged water to prepare a dilute liquid (emulsion) with a nonvolatile content of 1.0%. Emulsifiability was evaluated as stability using the dilute liquid.

With the dilute liquid of each treatment agent, light transmittance (%) at a wavelength of 750 nm was measured under conditions of 20° C. and 60% RH. As a measuring device, a spectrophotometer, UV-1800 SPECTROPHOTOMETER, manufactured by Shimadzu Corporation was used. The emulsifiability of the dilute liquid was evaluated according to criteria indicated below. The results are indicated in the "Emulsifiability" column of Table 1.

Evaluation Criteria of Emulsifiability

◎ (satisfactory): There was no separation and the light transmittance was not less than 50%.
○ (fair): There was no separation and the light transmittance was not less than 30% but less than 50%.
x (poor): There was separation.

Experimental Part 3 (Flexibility)

A wad of polyester synthetic fibers of 7 denier and a cut length of 32 mm generally used for cushion wadding, futons, etc., was used for evaluation. The evaluation was performed after first performing a washing operation with warm water of 40° C. and then drying for 2 hours at 80° C. to eliminate influence of lubricants, etc., used in producing the polyester synthetic fibers.

The treatment agent of each example prepared in Experimental Part 1 was diluted such as to be of an effective ingredient concentration of 12.5% to prepare a dilute liquid of emulsion form. 2.4 g of the emulsion were sprayed uniformly onto 100 g of the wad of polyester synthetic fibers. Thereafter, heat treatment (drying) at 150° C. was performed for 10 minutes to prepare a sample wad for evaluation. 0.3 g of the treatment agent are adhered to 100 g of the wad.

Evaluation of Flexibility

Flexibility of each dried sample wad was scored according to criteria indicated below by five experts of texture evaluation of fibers and an average score of the five experts was calculated by rounding off to two significant digits. The flexibility was evaluated according to criteria indicated below based on the calculated average score. The results are indicated in the "Flexibility" column of Table 1.

1 point: Has approximately the same flexibility as the wad of polyester synthetic fibers without the treatment agent adhered thereto.
2 points: More flexibility is felt than the wad of polyester synthetic fibers without the treatment agent adhered thereto.
3 points: Much more flexibility is felt than the wad of polyester synthetic fibers without the treatment agent adhered thereto.

◎ (satisfactory): The average score of the five experts was not less than 2.5 points.
○ (fair): The average score of the five experts was not less than 2.0 points but less than 2.5 points.
x (poor): The average score of the five experts was less than 2.0 points.

Experimental Part 4 (Antistatic Property)

With each of the sample wads with the respective treatment agents adhered thereto prepared in Experimental Part 3, 5 g were moisture conditioned for 24 hours inside a thermostatic chamber at 20° C. and 45% relative humidity. Thereafter, electrical resistances of the polyester synthetic fibers were measured using a known resistance measuring device and evaluated according to evaluation criteria indicated below. The results are indicated in the "Antistatic property" column of Table 1.

Evaluation Criteria of Antistatic Property

◎ (satisfactory): Surface resistance was less than $1.0 \times 10^{11} \Omega$.
○ (fair): Surface resistance was not less than $1.0 \times 10^{11} \Omega$ but less than $1.0 \times 10^{12} \Omega$.
x (poor): Surface resistance was not less than $1.0 \times 10^{12} \Omega$.

Experimental Part 5 (Bulkiness)

Bulkiness was evaluated by measuring compressive elastic recovery rate. The compressive elastic recovery rate was measured by a test method similar to that of JIS L2001.

With each of the sample wads with the respective treatment agents adhered thereto prepared in Experimental Part 3, 40 g were fed into a roller carding machine to prepare web of 30 cm×100 cm with the corresponding treatment agent adhered thereto. The web was cut out to prepare four sheets of fabric of 15 cm×15 cm. The four sheets of fabric were overlapped such that fiber directions were mutually orthogonal to prepare a rectangular parallelepiped body.

After leaving still for 30 minutes at 20° C. and 40% RH, a metal plate (135 g) of 15 cm×15 cm was placed on the rectangular parallelepiped body and a height (h1) of the rectangular parallelepiped body after 1 minute was recorded in 0.1 cm units. Further, a weight of 1,125 g was placed on the metal plate and, after leaving still for 24 hours, was removed upon recording the height (h2). The height (h3) of the rectangular parallelepiped body 1 minute after removing the weight was recorded.

The recovery rate was calculated by a formula indicated below.

$$\text{Recovery rate } (\%) = 100 \times (h3-h2)/(h1-h2)$$

It was judged that the higher the recovery rate, the better the bulkiness of the test wad.

◎ (satisfactory): The recovery rate (%) was not less than 80%.
○ (fair): The recovery rate (%) was not less than 50% but less than 80%.
x (poor): The recovery rate (%) was less than 50%.

Experimental Part 6 (Preparation of First Treatment Agents)

(First Treatment Agent P-1)

A first treatment agent (P-1) containing 80 parts (%) of silanol-modified silicone (number average molecular weight: 100,000) (A-1) as the silicone (A), 5 parts (%) of polydimethylsiloxane (viscosity: 1,000 mPa·s) as the silicone (C), 10 parts (%) of polyoxyethylene (6) polyoxypropylene (2) dodecyl ether (D-1) as the nonionic surfactant, and 5 parts (%) of sodium dodecyl sulfonate as the anionic ingredient was prepared.

(First Treatment Agents P-2 to P-14)

First treatment agents P-2 to P-14 were prepared in the same manner as the first treatment agent (P-1) such as to contain the silicones (A), the silicones (C), the nonionic surfactants, and the anionic ingredients at the amounts indicated in Table 2.

The types and contents of the silicones (A), the types and contents of the silicones (C), the types and contents of the nonionic surfactants, and the types and contents of the anionic ingredients are respectively indicated in the "Silicone (A)" column, the "Silicone (C)" column, the "Nonionic surfactant" column, and the "Anionic ingredient" column of Table 2.

chamber at 20° C. and 60% RH. The appearance was judged visually and evaluated according to criteria indicated below. The results are indicated in the "Formulation stability" column of Table 2.

Evaluation of Formulation Stabilities of Second Treatment Agents

Each second treatment agent was temperature controlled for 24 hours inside a thermostatic chamber at 20° C. and 60% RH. The appearance was judged visually and evaluated

TABLE 2

| First treatment agent | Silicone (A) | | Silicone (C) | | Nonionic surfactant | | Anionic ingredient | | Evaluation |
|---|---|---|---|---|---|---|---|---|---|
| | Type | Content (%) | Type | Content (%) | Type | Content (%) | Type | Content (%) | Formulation stability |
| P-1 | A-1 | 80 | C-1 | 5 | D-1 | 10 | E-1 | 5 | ◎ |
| P-2 | A-2 | 70 | C-2 | 2 | D-1 | 10 | E-2 | 18 | ◎ |
| P-3 | A-3 | 70 | C-3 | 5 | D-1 | 10 | E-3 | 15 | ◎ |
| P-4 | A-4 | 60 | | | D-2 | 20 | E-4 | 20 | ◎ |
| P-5 | A-5 | 75 | | | D-2 | 5 | E-5 | 20 | ◎ |
| P-6 | A-1 | 40 | | | D-1 | 35 | E-2 | 25 | ◎ |
| P-7 | A-2 | 97.5 | | | D-1 | 1.5 | E-4 | 1 | ◎ |
| P-8 | A-1 | 80 | | | D-1 | 0.5 | E-5 | 19.5 | ◎ |
| P-9 | A-3 | 55 | | | D-2 | 40 | E-3 | 5 | ◎ |
| P-10 | A-5 | 60 | | | D-2 | 10 | E-4 | 30 | ◎ |
| P-11 | A-2 | 80 | | | D-3 | 10 | E-1 | 10 | ◎ |
| P-12 | A-5 | 85 | | | D-4 | 10 | E-2 | 5 | ◎ |
| P-13 | A-1 | 45 | C-3 | 5 | D-3 | 25 | E-1 | 25 | ◎ |
| P-14 | A-2 | 98 | | | D-4 | 0.5 | E-2 | 1.5 | ◎ |

Experimental Part 7 (Preparation of Second Treatment Agents)
(Second Treatment Agent S-1)

A second treatment agent (S-1) was made to contain 100 parts (%) of 3-aminopropyltriethoxysilane (functional groups: amino group and methoxy group) (B-1) as the silicone (B).

(Second Treatment Agents S-2 to S-6)

Second treatment agents S-2 to S-6 were prepared such as to contain the silicones (B) at the amounts indicated in Table 3. The types and contents of the silicones (B) are indicated in the "Silicone (B)" column of Table 3.

TABLE 3

| Second treatment agent | Silicone (B) | | Evaluation |
|---|---|---|---|
| | Type | Content (%) | Formulation stability |
| S-1 | B-1 | 100 | ◎ |
| S-2 | B-2 | 100 | ◎ |
| S-3 | B-3 | 100 | ◎ |
| S-4 | B-4 | 100 | ◎ |
| S-5 | B-5 | 100 | ◎ |
| S-6 | B-6 | 100 | ◎ |

Experimental Part 8 (Evaluation of Formulation Stability)
Evaluation of Formulation Stabilities of First Treatment Agents Each first treatment agent was adjusted to be 40% in concentration by adding ion exchanged water and emulsified by a homogenizer to prepare an emulsion (first treatment agent-containing composition). The emulsion obtained was temperature controlled for 24 hours inside a thermostatic according to criteria indicated below. The results are indicated in the "Formulation stability" column of Table 3.
Evaluation Criteria of Formulation Stability (First Treatment Agent and Second Treatment Agent)

◎ (satisfactory): Separation did not occur.

x (poor): Separation occurred.

Experimental Part 9 (Preparation of Treatment Agents from First Treatment Agents and Second Treatment Agents)

Example 36

A treatment agent of Example 36 was prepared by mixing 95% (parts) of the first treatment agent (P-1) and 5% (parts) of the second treatment agent (S-1) shown in Table 4.

Examples 37 to 54

Treatment agents of respective examples were prepared in the same manner as Example 36 by mixing the first treatment agents and the second treatment agents shown in Table 4. The types and mass ratios of the first treatment agents and the types and mass ratios of the second treatment agents are respectively indicated in the "First treatment agent" column and the "Second treatment agent" column of Table 4.

The emulsifiability, antistatic property, flexibility, and bulkiness were evaluated by the same methods as with Example 1 using the treatment agents of the respective examples obtained. The results are respectively indicated in the "Emulsifiability" column, the "Antistatic property" column, the "Flexibility" column, and the "Bulkiness" column of Table 4.

TABLE 4

| | First treatment agent | | Second treatment agent | | | | | |
|---|---|---|---|---|---|---|---|---|
| Category | Type | Mass ratio (%) | Type | Mass ratio (%) | Emulsifiability | Antistatic property | Flexibility | Bulkiness |
| Example 36 | P-1 | 95 | S-1 | 5 | ◎ | ◎ | ◎ | ◎ |
| Example 37 | P-2 | 95 | S-2 | 5 | ◎ | ◎ | ◎ | ◎ |
| Example 38 | P-3 | 95 | S-3 | 5 | ◎ | ◎ | ◎ | ◎ |
| Example 39 | P-4 | 95 | S-1 | 5 | ◎ | ◎ | ◎ | ◎ |
| Example 40 | P-5 | 95 | S-2 | 5 | ◎ | ◎ | ◎ | ◎ |
| Example 41 | P-6 | 95 | S-3 | 5 | ◎ | ◎ | ○ | ◎ |
| Example 42 | P-7 | 95 | S-1 | 5 | ○ | ◎ | ◎ | ◎ |
| Example 43 | P-8 | 95 | S-2 | 5 | ○ | ◎ | ◎ | ◎ |
| Example 44 | P-9 | 95 | S-3 | 5 | ◎ | ◎ | ◎ | ○ |
| Example 45 | P-10 | 95 | S-1 | 5 | ◎ | ◎ | ◎ | ○ |
| Example 46 | P-11 | 95 | S-2 | 5 | ○ | ○ | ◎ | ◎ |
| Example 47 | P-12 | 95 | S-3 | 5 | ○ | ○ | ◎ | ◎ |
| Example 48 | P-13 | 95 | S-1 | 5 | ○ | ○ | ○ | ◎ |
| Example 49 | P-14 | 95 | S-2 | 5 | ○ | ○ | ◎ | ○ |
| Example 50 | P-1 | 95 | S-4 | 5 | ◎ | ◎ | ○ | ◎ |
| Example 51 | P-2 | 95 | S-5 | 5 | ◎ | ◎ | ○ | ◎ |
| Example 52 | P-3 | 95 | S-6 | 5 | ◎ | ◎ | ○ | ◎ |
| Example 53 | P-13 | 95 | S-5 | 5 | ○ | ○ | ○ | ○ |
| Example 54 | P-14 | 95 | S-6 | 5 | ○ | ○ | ○ | ○ |

As is clear from a comparison of the evaluation results of the respective Examples and the respective Comparative Examples in Table 1, the treatment agent of the present invention is capable of improving emulsifiability. Also, the fibers with the treatment agent applied thereto can be improved in antistatic property, flexibility, and bulkiness. Also, the first treatment agent and the second treatment agent of the present invention are capable of improving the formulation stability.

The invention claimed is:

1. A polyester synthetic fiber treatment agent comprising a silicone (A) described below, a silicone (B) described below, a nonionic surfactant, an anionic ingredient, and optionally a silicone (C) described below, wherein
the amount of the silicone (C) contained in the polyester synthetic fiber treatment agent is less than 10% by mass,
the silicone (A) is a silanol-modified silicone with a number average molecular weight of not less than 50,000 but less than 200,000,
the silicone (B) is a silane coupling agent having at least one functional group selected from the group consisting of a methoxy group, an ethoxy group, an amino group, and an isocyanate group but not including an epoxy group in the molecule, and
the silicone (C) is at least one selected from the group consisting of silicone resins, dimethyl silicones, and alkyl-modified silicones but excluding those corresponding to being the silicone (A);
wherein the nonionic surfactant includes at least one compound obtained by adding, in total, from 3 to 50 moles, inclusive, of an alkylene oxide to 1 mole of an alcohol, the alkylene oxide having from 2 to 3 carbon atoms, inclusive, and the alcohol having from 2 to 18 carbon atoms, inclusive, and having from 1 to 4 hydroxyl groups, inclusive.

2. The polyester synthetic fiber treatment agent according to claim 1, wherein the silicone (B) includes an amino group in the molecule.

3. The polyester synthetic fiber treatment agent according to claim 1, wherein the anionic ingredient includes at least one selected from the group consisting of organic acids, alkyl sulfonic acids, alkyl sulfuric acids, polyoxyalkylene alkyl sulfuric acids, alkyl phosphoric acid esters, polyoxyalkylene alkyl phosphoric acid esters, and salts thereof.

4. The polyester synthetic fiber treatment agent according to claim 1, wherein in the polyester synthetic fiber treatment agent, the amount of the silicone (A) contained is not less than 50% by mass and not more than 95% by mass, the amount of the silicone (B) contained is not less than 1% by mass and not more than 25% by mass, the amount of the silicone (C) contained is not less than 0% by mass but less than 10% by mass, the amount of the nonionic surfactant contained is not less than 1% by mass and not more than 20% by mass, and the amount of the anionic ingredient contained is not less than 0.1% by mass and not more than 20% by mass.

5. The polyester synthetic fiber treatment agent according to claim 1, wherein the polyester synthetic fiber treatment agent is arranged as a set that includes a first agent for treating a polyester synthetic fiber containing the silicone (A), the nonionic surfactant, the anionic ingredient, and optionally the silicone (C) and a second agent for treating a polyester synthetic fiber containing the silicone (B).

6. A composition containing a polyester synthetic fiber treatment agent, comprising the polyester synthetic fiber treatment agent according to claim 1 and a solvent.

7. A polyester synthetic fiber to which the polyester synthetic fiber treatment agent according to claim 1 is adhered.

8. The polyester synthetic fiber according to claim 7, wherein the polyester synthetic fiber is applied to wadding.

9. A first agent for treating a polyester synthetic fiber that is combined in use with a second agent for treating a polyester synthetic fiber containing a silicone (B) described below, the first agent for treating a polyester synthetic fiber comprising a silicone (A) described below, a nonionic surfactant, an anionic ingredient, and optionally a silicone (C) described below, wherein
the amount of the silicone (C) contained in a mixture of the first agent for treating a polyester synthetic fiber and the second agent for treating a polyester synthetic fiber is less than 10% by mass,
the silicone (A) is a silanol-modified silicone with a number average molecular weight of not less than 50,000 but less than 200,000, the silicone (B) is a silane coupling agent having at least one functional group selected from the group consisting of a methoxy group, an ethoxy group, an amino group, and an isocyanate group but not including an epoxy group in the molecule, the silicone (C) is at least one selected from the group consisting of silicone resins, dimethyl silicones, and alkyl-modified silicones but excluding those corresponding to being the silicone (A);

wherein the nonionic surfactant includes at least one compound obtained by adding, in total, from 3 to 50 moles, inclusive, of an alkylene oxide to 1 mole of an alcohol, the alkylene oxide having from 2 to 3 carbon atoms, inclusive, and the alcohol having from 2 to 18 carbon atoms, inclusive, and having from 1 to 4 hydroxyl groups, inclusive.

10. A composition containing a first agent for treating a polyester synthetic fiber, comprising the first agent for treating a polyester synthetic fiber according to claim 9 and a solvent.

11. A method for treating a polyester synthetic fiber, comprising applying to a polyester synthetic fiber a dilute liquid of a polyester synthetic fiber treatment agent that is obtained by adding to a solvent the composition containing a first agent for treating a polyester synthetic fiber according to claim 10 and a second agent for treating a polyester synthetic fiber containing a silicone (B) described below, wherein the silicone (B) is a silane coupling agent having at least one functional group selected from the group consisting of a methoxy group, an ethoxy group, an amino group, and an isocyanate group but not including an epoxy group in the molecule.

12. The method for treating a polyester synthetic fiber according to claim 11, wherein the fiber to which the dilute liquid of a polyester synthetic fiber treatment agent has been applied is heat treated at not less than 100° C. and not more than 200° C.

* * * * *